United States Patent Office 3,099,883
Patented Aug. 6, 1963

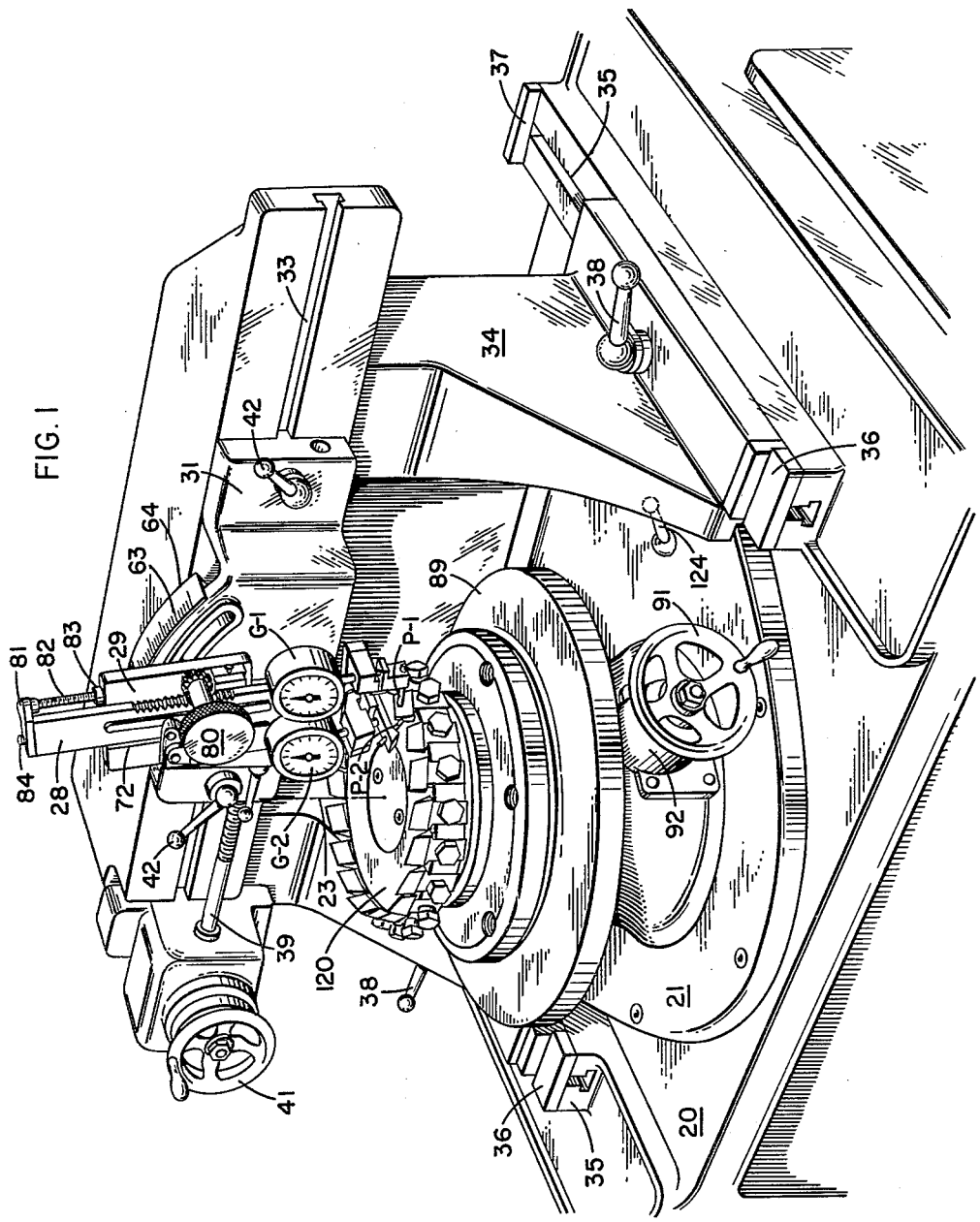

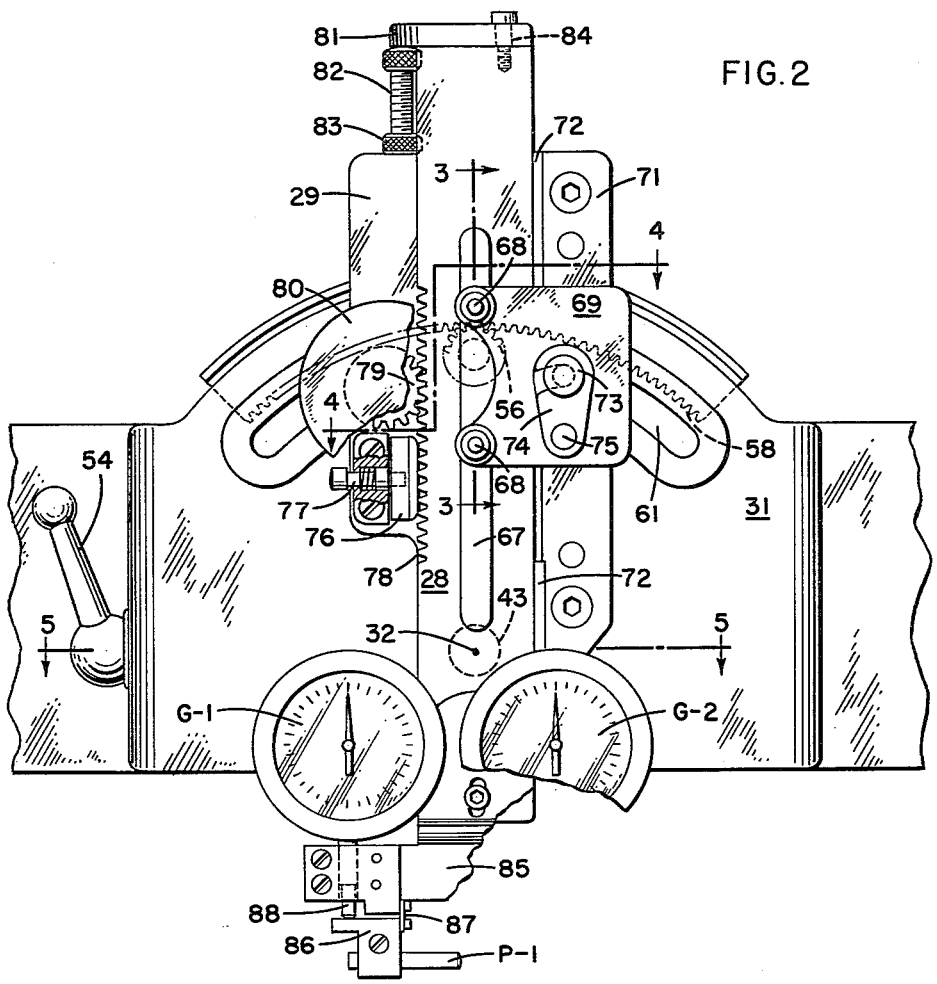
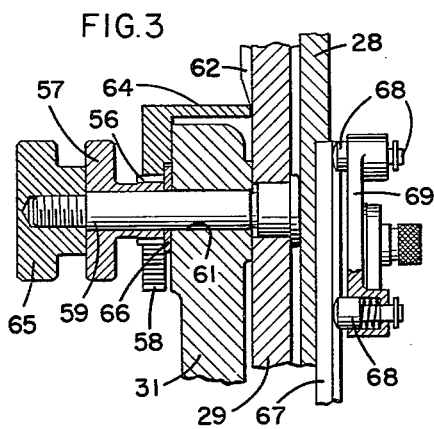
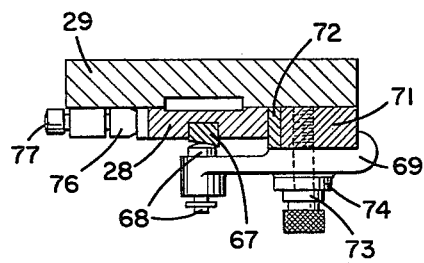

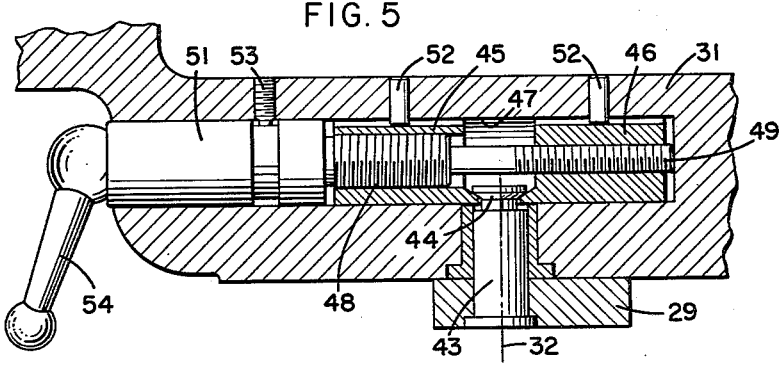
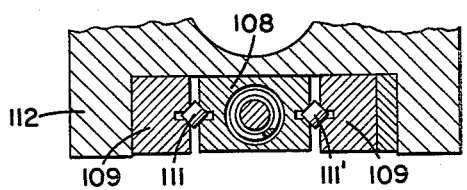
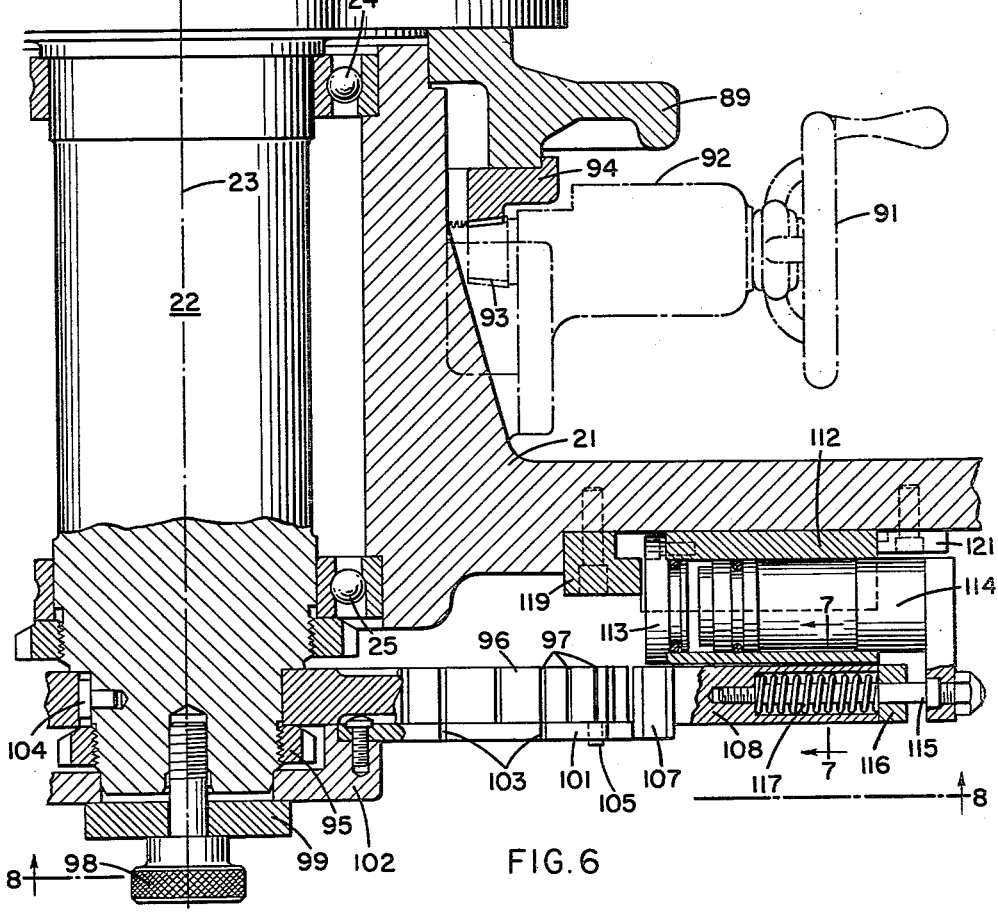

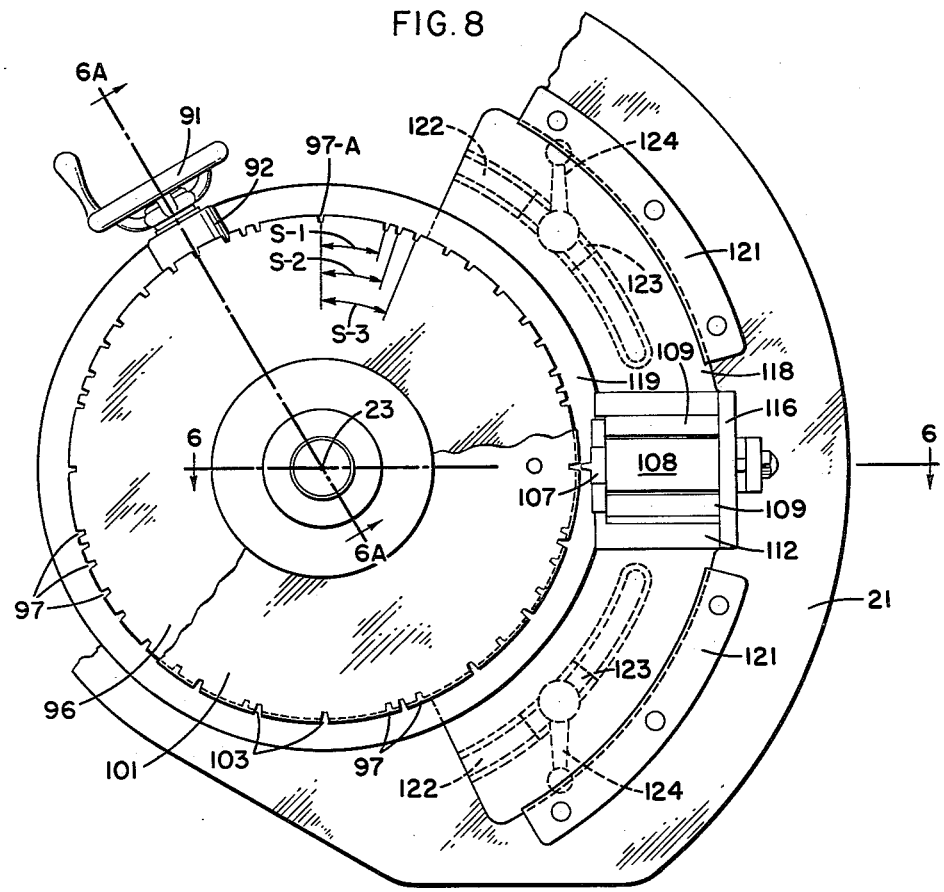
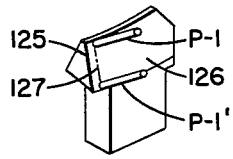
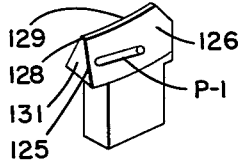
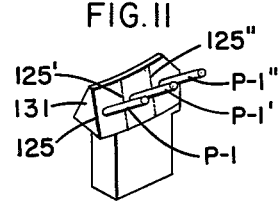
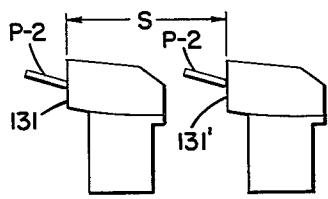
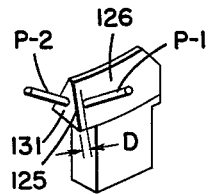
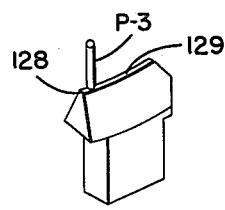

3,099,883
CUTTER CHECKING DEVICE AND METHOD
Werner E. Bergemann, Rochester, and Donald L. Whitmore, Webster, N.Y., assignors to The Gleason Works, Rochester, N.Y., a corporation of New York
Filed Dec. 29, 1959, Ser. No. 862,536
14 Claims. (Cl. 33—201)

The present invention relates to a device for and method of checking cutters, especially face mill cutters of the kind used for cutting spiral bevel and hypoid gears.

An object of the invention is a device of this character capable of checking, in a single mounting of a cutter, the truth of mounting of the cutter head on the spindle of the checking device, the pressure angles of the cutter blades, the radial and axial runout or eccentricity of the blades considered collectively, the blade spacing or accuracy of blade sharpening, and the side and tip relief of the blades.

Another object is an improved method of checking cutters whereby local irregularities of the cutting edges, such as burrs and nicks which may result from a sharpening operation, will not interfere with the accuracy of the checks.

The foregoing and other objects and advantages of the invention will appear from the following description of the preferred embodiment shown in the accompanying drawings, wherein:

FIG. 1 is a perspective view of the device;

FIG. 2 a front view, on a larger scale, of the gage supporting structure of the device, with a part broken away and appearing in vertical section;

FIGS. 3, 4 and 5 are detail sectional views respectively in the planes indicated at 3—3, 4—4 and 5—5 in FIG. 2;

FIG. 6 is a vertical section through the cutter spindle in the plane 6—6 of FIG. 8, and showing in broken lines a handwheel and parts related to it as they would appear in plane 6A—6A of FIG. 8;

FIG. 7 is a detail sectional view in plane 7—7 of FIG. 6;

FIG. 8 is a bottom plan view, in plane 8—8 of FIG. 6; and,

FIGS. 9 to 14 are diagrammatic views showing the relationships between the gage contact points and the cutter blades in various checking operations.

The device illustrated comprises a frame 20 including a bearing housing 21 in which a cutter spindle 22 is journaled for rotation about a vertical axis 23 on spaced antifriction bearings 24 and 25. The upper end of the spindle comprises a center 26 and a face plate 27 for centering and seating a face mill cutter C whose blades B are to be checked and/or trued on the device.

Indicator gages G–1 and G–2 for contact with the blades B are mounted on a carrier comprising a slide 28 movable rectilinearly on a bracket 29. The bracket is angularly adjustable upon a support 31 about an axis 32, FIG. 2, which is horizontal and hence perpendicular to cutter or cutter spindle axis 23. Support 31 is a slide adjustable horizontally, but in a direction perpendicular to axis 32, along T-slotted guideway 33 of a column 34. The column is movable horizontally along T-slotted guideways 35 of frame 20 in a direction parallel to axis 32 and perpendicular to cutter spindle axis 23 and also perpendicular to guideway 33.

The column is movable manually between its forward position, shown in FIG. 1, wherein it abuts stops 36 and a rearward position wherein it abuts stops 37. It may be moved to the rearward position to facilitate mounting or demounting a cutter. In its forward position the indicator gages, designated G–1 and G–2, are disposed substantially in a vertical plane which is parallel to guideway 33 and contains the cutter axis 23. While in this forward position the column is clamped to the frame by screw clamps which have anchor nuts slidable in the T-slots of the guideways 35. The actuating handles of the screw clamps are designated 38.

The horizontal adjustment of the gage support slide 31 on the column, to position the gages for a cutter of any particular diameter, is effected by means of a screw 39 that may be rotated by turning a handwheel 41, the handwheel being connected to the screw by bevel gears, not shown. After such adjustment the slide 31 may be clamped to the column by screw clamps whose handles are shown at 42 and whose anchor nuts are slidable in the T-slot of guideway 33.

As shown in FIGS. 2 and 5 the bracket 29 is pivoted on axis 32 to its support 31 by means of a pivot pin 43. The inner end of this pin has a head with a conical surface 44 engaged by projections on cylindrical nuts 45 and 46 which are slidable in a bore 47 in support 31 and are screw-threaded respectively to left-hand threaded portion 48 and right-hand threaded portion 49 of a screw 51 in the bore. The nuts have keyways engaged by pins 52 which hold them against rotation. Screw 51 has an annular groove into which a screw threaded key 53 extends to limit axial motion of the screw. Accordingly by rotation of the latter, by means of its handle 54, the nuts may be drawn together to grip pin 43 and draw it inwardly (upwardly in FIG. 5) to draw the bracket 29 against the plane front face of support 31, or to move the nuts apart to allow removal and replacement of the bracket and the pin 43 from the support.

By turning the handle, to slightly loosen the grip of nuts 45, 46 on the pin 43, the bracket 29 is freed for angular adjustment about axis 32. Such adjustment may be made by rotating a pinion 56, FIGS. 2 and 3, by means of an integral knob 57, the pinion engaging an internal gear sector 58 secured to the support 31. The pinion is rotatable on a screw 59 which is secured to bracket 29 and extends through an arcuate slot 61 in support 31, the slot being concentric with axis 32. The adjustment, which is employed to bring the gage carrier slide 28 to the desired inclination, may be made with the aid of a pointer 62, FIG. 3, on the bracket 29 and cooperating calibrations 63, FIG. 1, on flange 64 of gear sector 58. After such adjustment the bracket 29 and pinion 56 may be clamped to the support 31 by tightening a nut 65 that is threaded to screw 59. A washer 66 on screw 59 is interposed between pinion 56 and support 31.

Gage carrier slide 28, FIGS. 2, 3 and 4, has secured in inset relation therein a rail 67 having an inclined forward face against which press a pair of spring-backed plungers 68 carried by a plate 69, the plate being detachably connected to a guide 71 that is secured to carrier bracket 29 and has soldered thereto hardened guideways 72. The plate has an opening large enough to pass the head of a thumb screw 73 that is threaded in the guide; and a retainer 74 is interposed between the screw head and the plate 69, the retainer being pivoted at 75 to the plate, and having an arcuate slot for passing the shank of the screw. The arrangement is such that by loosening the screw and pivoting the retainer clear of the screw head, the plate can be removed. This enables quick removal of the gage carrier slide 28 for cleaning or replacement. The carrier slide is pressed against guideways 72 by a shoe 76 carried by a spring-backed plunger 77 slidably supported by bracket 29. The plunger may be manually withdrawn to lift the shoe from engagement with the gage carrier slide 28 while the latter is being removed and replaced.

The edge of slide 28 engaged by the shoe 76 has rack teeth 78 formed thereon for meshing with a pinion 79 that is rotatably mounted on the bracket 29. The pinion is turned, by means of a knob 80 secured to it, to move the slide 28, and the gages carried by it, up or down along the guides 71, 72 against the frictional resistance resulting from the spring pressure applied through shoe 76 and plungers 68. The slide 28 may be stopped in a predetermined downward limit position by abutment of a stop 81 thereon with the knurled head of an adjustment screw 82 that is threaded into bracket 29. The screw is secured in any position of adjustment by a knurled lock nut 83. The stop 81 is pivoted to the slide by a pin 84 in order that it may be swung clear of screw 82 when greater travel of the slide is desired.

The gages G-1 and G-2 are mounted on a suitable adapter bracket 85 secured to the lower end of carrier slide 28. The respective gage contact points P-1 and P-2 have suitably articulated connections to the adapter bracket to enable transmission of motion from the contact points to the stems of the gages. The details of the adapter structure depend upon the direction of the contact point motion that is to be measured, and such details are not part of the present invention. However, as one example, the contact point P-1, whose motion is from left to right in FIG. 1, is secured to a right angle offset attachment 86 connected by a reed 87 and adapted to impart vertical motion to the vertically movable stem 88 of gage G-1.

For indexing the cutter spindle 22 to bring the several blades of the cutter successively beneath the gages, the index mechanism shown in FIGS. 1 and 6 to 8 is provided. Actual rotation of the spindle is accomplished by turning either a hand rim 89 that is secured to the bottom of face plate 27 or a handwheel 91 whose shaft is journaled for rotation in a bracket 92 fastened to housing 21, the shaft having thereon a bevel pinion 93 meshing with a ring gear 94 secured to the hand rim. Detachably secured to the lower end of spindle 22 by means of a clamp nut 95 is a circular index plate 96 with a plurality of series of notches 97. The notches of one series, beginning with master slot 97-A, are uniformly spaced angularly about axis 23 in accordance with the angular blade edge to blade edge spacing S-1 of one design of cutter C to be checked on the device; the notches of another series, also beginning with slot 97-A, have a different spacing S-2, corresponding to the blade edge spacing of another design of cutter C to be checked; and the notches of a third series have a still different spacing S-3. Also secured to the spindle for easy detachment, by thumbscrew 98 and washer 99, is a light weight masking plate 101 of slightly large diameter than the index plate. The masking plate has a hub 102 fitting the spindle and a single series of notches 103. These are slightly larger than notches 97 and are spaced angularly in the same way as the blades of one particular cutter to be checked. The masking plate shown is one of a series of interchangeable plates having different numbers of notches and adapted for use with cutters having different numbers of blades. A key 104 holds index plate 96 against rotation on the spindle, while the engagement of a pin 105 carried by the index plate in a positioning hole in the masking plate locates the latter in the desired angular position.

The index mechanism further includes a pawl 107 for engagement in an index plate notch 97 and an aligned notch 103 in the masking plate. The pawl is carried by a horizontal slide 108 supported on ways 109 by two sets of cylindrical roller bearings 111 and 111' of which the alternate rollers of each set have their cylinder axes oppositely inclined. The ways are secured to a cylinder block 112 whose cylinder chamber is parallel to slide 108 and is closed by cylinder head 113. A piston 114 in the cylinder is connected to the slide by a stud 115 which extends slidably through a plate 116 secured to the block. Around the stud is a coil spring 117 compressed between the plate and the slide, the spring constantly urging advance of the pawl and piston assembly, 107, 108, 115, 114, toward the index plate. Fluid pressure is applied to the cylinder chamber, under the control of a pedal actuated valve (not shown) whenever it is desired to withdraw the pawl from the index plate.

The cylinder block 112 is formed integrally with a circular slide 118 supported by inner and outer circular gibs 119 and 121 for limited angular motion about axis 23. The upper surface of slide 118 has circular T-slots 122 formed therein, and clamp nuts 123 in these slots are threaded to clamp screws which are rotatable in spindle housing 21 and whose handles are designated 124, FIGS. 1 and 8.

After mounting a cutter to be checked on the spindles 22, 26, 27, the gage carrier slide 28 may be lowered to bring the contact point of one gage against the front face 129, FIG. 1, and the spindle is rotated. If the cutter mounting is true, the gage will read zero throughout such rotation, and the further checks of the cutter may therefore be commenced.

In checking a left-hand cutter such as is shown in FIG. 1 (a cutter which rotates counterclockwise as viewed from its back face), having outside cutting edges, such as edge 125 in FIG. 9, the bracket 29 is adjusted about axis 32, FIGS. 2, 3 and 5, with the aid of calibrations 63 so that the path of motion of gage carrier slide 28 will be inclined to the vertical by the intended cutter pressure angle, i.e. the angle between the cutter axis 23 and the conical cutting surface described by the edge 125 as the cutter rotates about axis 23. With the master blade of the cutter beneath gage G-1 and the index pawl 107 engaged in a notch of the index plate, the circular slide 118 is adjusted by manual operation of handwheel 91 or of rim 89 so that contact point P-1 will contact cutting side face 126 of one blade along a line 127 that is back of the edge 125 far enough as to be clear of any irregularities such as burrs or nicks on the edge. The contact point may then be trammed along line 127 between positions P-1 and P-1' of FIG. 9 and observations made on gage G-1 of the magnitude of any motion of the point. The bracket 29 is then adjusted about axis 32 so that the gage G-1 will read zero throughout such tramming action. By calibrations 63, FIG. 1, any departure of the pressure angle from the intended value can be determined. By then indexing the other blades to a position beneath the gage and tramming the point P-1 over them, the magnitude of any departure of these blades from the pressure angle of the master blade may be determined.

The manner of checking the cutter to determine that the cutting edges 125 of all blades are at the same radial distance from axis 23 is illustrated in FIG. 10. First the circular slide 118 is adjusted, as before, to cause point P-1 to contact the cutting side face of the master blade at a point sufficiently back of edge 125 as to be clear of burrs and nicks along the edge. The bracket 29 is adjusted so that gage carrier slide 28 will move vertically. Screw 82, FIGS. 1 and 2, is then adjusted so that in the lowermost position of the gage carrier slide 28 the point P-1 will contact the blade at a distance below its tip cutting edge 128 corresponding approximately to half the average depth of the gear tooth space to be cut. The gage G-1 is set to read zero, then the slide 28 is raised and the spindle is indexed to bring the next cutter blade into gaging position, the slide is lowered to its limit position, and the gage is read. By repetition of this process the magnitude of any deviation of the blades in respect of their radial position may be determined. In some cases, where the condition of the edges 125 is good and the contact point touches the blade quite close behind such edges, this check may be made without raising and lowering slide 28 before and after the indexing, without disturbing the adjustment of the gage, provided of course the cutter is indexed in the direction opposite to that in which its cuts.

In cutters of the type concerned, the cutting side faces 126 and the tip faces 129 are always relieved back of their cutting edges. Such relief is usually accomplished by grinding these faces as helical surfaces co-axial with the cutter axis 23, so that upon sharpening of the cutter by grinding back the front faces 131 of the blades, the relationship between the side cutting edge 125, the tip cutting edge 128 and the cutter axis 23 will not be changed. Referring to FIG. 11 many repetitions of such sharpening may move the side cutting edges 125 back to position 125' and finally to position 125". In order to check a cutter to determine that the relief is the same on all blades, so that the aforementioned relationship will not be disturbed if all blades are sharpened back by exactly the same amount, the check described in connection with FIG. 10 may be repeated several times with the circular slide 118 adjusted differently for each repetition. That is, for example, all of the blades may be checked with the point P-1 contacting a small distance back of edge 125. They may then be checked again with the contact point in the relative position indicated at P-1' and then again with it in the relative position shown at P-1". In this way the magnitude of any difference between the blades with respect to side relief may be determined.

Due to the relief of the faces 126, 129 it is necessary, if the check described above in connection with FIG. 10 is to be meaningful, not only that the angular spacing of the index plate notches 97 be exact but also that the angular or circumferential spacing of the front or sharpening faces 131 of the cutter blades be within acceptably close tolerances. To check this circumferential spacing, designated S in FIG. 12, the device is so adjusted that the contact point P-2 of gage G-2 contacts a mean point of the front face 131 of the master blade and the gage is adjusted to read zero. Then the slide 28 is raised, the cutter is indexed, and the slide lowered so that point P-2 contacts front face 131' of the next blade. The indicator reading will show the magnitude of any deviation of blade spacing from value S. By repeating this test for every blade of the cutter, and recording the results, it may be determined whether the accuracy of cutter sharpening has been within acceptable tolerances.

If desired the checks illustrated in FIGS. 10 and 12 may be made simultaneously. That is, as shown in FIG. 13, the gages and their adapters may be so positioned that point P-1 of gage G-1 will contact cutting side face 126 at the same time that point P-2 of gage G-2 contacts the front face 131. If the reading of gage G-2 is zero or acceptably near thereto, showing that the sharpening has been performed accurately, then a reading of gage G-1 of zero, or acceptably near thereto, gives assurance that the radial position of the side cutting edge 125 is correct.

Even in cases where the cutter blades are irregularly spaced circumferentially, a check similar to that referred to in the preceding paragraph may be made on the device. That is, with the gages arranged as indicated in FIG. 13, and with the index pawl held disengaged from the index plate, the cutter may be rotated by means of handwheel 91 until gage G-2 reads zero, showing that point P-1 is a definite distance D back of edge 125, and hence that the reading of gage G-1 is acceptable. By repeating this process for each blade of the cutter, the accuracy of the radial positioning of the edges 125 around the cutter can be determined.

The axial positions of tip cutting edges 128 can be checked in essentially the same way that the radial positions of edges 125 are made, except that for the gage with point P-1, another gage or gage adapter having a vertically movable contact point P-3, FIG. 14, is substituted. As shown the blade is so positioned that the point P-3 contacts its surface 129 a short distance back of tip cutting edge 128.

Where cutters of two or more different designs are frequently being checked, it may be preferable to avoid frequent adjustments, interchange of gage adapters, etc., by having a number of interchangeable gage units, each including a bracket 29 and the parts supported thereby including slide 28 and the gages thereon. In such cases it is preferred to have these units of opposite hand, so that in making checks such as described in connection with FIG. 9, the inclination of bracket 29 will always aid in retention of the gage carrier slide 28 against ways 72. That is, for checking outside cutter blades, as in FIG. 1, where the bracket 29 may be inclined by pivoting it counterclockwise about axis 32, the unit has ways 72 on the left side of slide 28 and the rack teeth on the right side thereof; while for checking inside cutter blades, where the check by the method of FIG. 9 may require the bracket 29 to be oppositely inclined, the gage unit is preferably made of opposite hand, as illustrated in FIG. 2, where the ways 72 are on the right side of slide 28 and the rack teeth 78 are on the left side.

Having now described the preferred embodiment of our checking device, and the preferred methods of performing checks thereon, what we claim as our invention is:

1. A device for checking face mill gear cutters comprising a frame, a cutter spindle rotatable on the frame, means effective between the cutter spindle and the frame for indexing the cutter spindle completely around its rotation axis relative to the frame through angular increments corresponding to the blade pitch of the cutter being checked to successively bring the several blades of the cutter to gaging position, gage means and a carrier therefor movable in a definite path relative to the frame toward and away from the cutter to carry the gage means into and out of contact with a blade in gaging position, means effective between the carrier and the cutter spindle and operable independently of the indexing means for adjusting the indexed position of the cutter spindle angularly about its rotation axis in respect to the gage means, and stop means effective between the carrier and the frame for limiting movement of the carrier toward such blade, whereby the carrier may be brought to the same position for checking every blade of the cutter and the gage means may be caused to contact each blade at a selected distance back of its cutting edge.

2. A device according to claim 1 in which there is a column movable in a definite path on the frame toward and away from a fixed stop on the frame to carry the gage means to and away from gaging position, said motion being in a direction perpendicular to the spindle axis, and both the carrier and said stop for limiting movement of the carrier are carried by said column.

3. A device according to claim 1 in which said carrier is a slide, and there is a support for said slide carried by the column and adjustable rectilinearly thereon, in a direction perpendicular to the spindle axis, to thereby position the gage means for cutters of different diameters.

4. A device according to claim 3 in which there is a bracket on which the slide is movable, said bracket being adjustable angularly on said support about an axis perpendicular to the spindle axis and also perpendicular to the direction in which the support is adjustable on the column, whereby the direction of slide motion may be adjusted in accordance with the pressure angle of a blade surface to be trammed by the gage means by motion of the carrier.

5. A device according to claim 1 in which the gage means comprises two gages for simultaneous engagement with a blade of the cutter, one gage being adapted to contact a side face of the blade and the other a front face of the blade.

6. A device according to claim 4 in which there is a pinion-and-rack drive for reciprocating the slide on the bracket, and a manually operable knob connected to the pinion of said drive.

7. A device according to claim 1 in which the means for indexing the cutter spindle comprises a notched index plate mounted on the spindle, a circular slide adjustable on the frame about the spindle axis, and a locking pawl carried by the circular slide and movable thereon to engage or disengage a notch of said plate.

8. A device according to claim 7 in which there is a cylinder on said slide, and an actuating piston reciprocable in the cylinder and connected with the pawl for effecting the aforesaid movement of the pawl.

9. A device for checking face mill cutters comprising a frame, a cutter spindle rotatable on the frame, a slide carrying two gages adapted for simultaneous contact respectively with a side face and a front face of a cutter blade, said slide being movable in a definite path on the frame toward and away from the cutter, a stop on the frame limiting movement of the slide toward the cutter to bring the gages to the same position for checking each of the several blades of the cutter, said gage adapted for contact with the front face constituting a means for checking any variation between the blades in respect of the distance from the front face to the point of contact of the other gage with the side face.

10. The method of checking a face mill cutter in respect of the radial positions of the side cutting edges of its blades, with a gage having a movable contact point, the method comprising intermittently indexing the cutter, relative to a reference structure, about the cutter rotation axis, through angular increments corresponding to the angular spacing of said side cutting edges; in each indexed position of the cutter contacting the cutting side face of a blade with said gage contact point adjacent to but sufficiently back of the side cutting edge of the blade to clear irregularities of said edge; and with such contacting of every blade being effected while the gage body is in the same relation to said reference structure.

11. The method of claim 10 in which the operations there stated are repeated with the contact at a greater distance back of the side cutting edge of each blade.

12. The method of checking a face mill cutter in respect of the radial positions of the side cutting edges of its blades, with gages having movable contact points, the method comprising intermittently indexing the cutter, relative to a reference structure, about the cutter rotation axis, through angular increments corresponding to the intended angular spacing of said side cutting edges; in each indexed position of the cutter contacting the front face of a blade with a gage contact point; in each indexed position of the cutter contacting the cutting side face of a blade with a gage contact point adjacent to but sufficiently back of the side cutting edge of the blade to clear irregularities of said edge; and with each of the aforementioned blade contacting steps being effected while the gage bodies are in the same relation to said reference structure.

13. The method of checking a face mill cutter in respect of the radial positions of the side cutting edges of its blades, with gages having movable contact points, the method comprising successively checking each blade by rotating the cutter with its axis in fixed relation to a reference structure to thereby simultaneously contact the front face of the blade with the contact point of one gage, and contact the cutting side face of the blade, at a point thereon adjacent to but sufficiently back of the side cutting edge of the blade to clear irregularities of said edge, with the contact point of another gage, with the gages in the same relation to the reference structure when checking each blade, and the check by means of said other gage being made when the cutter has been rotated to bring the blade being checked into a predetermined relation to said one gage that is the same for every blade.

14. The method of checking a face mill cutter in respect of pressure angle, with a gage movable on a rectilinear slide and having a movable contact point, the method comprising so positioning said slide relative to a reference structure as to carry said contact point in a path that is substantially in a plane containing the axis of rotation of the cutter, angularly positioning the cutter about its axis relative to said contact point to cause the latter to contact the cutting side face of a blade of the cutter adjacent to but sufficiently back of the side cutting edge thereof to clear irregularities of said edge, intermittently indexing the cutter relative to said reference structure about the cutter rotation axis through angular increments corresponding to the angular spacing of the side cutting edges of the cutter blades, and in each indexed position of the cutter moving said slide to thereby tram the gage contact point over the cutting side face of a blade.

References Cited in the file of this patent

UNITED STATES PATENTS

| 1,836,662 | Head | Dec. 15, 1931 |
| 1,886,543 | Hansen | Nov. 8, 1932 |
| 1,949,014 | Gleason et al. | Feb. 27, 1934 |
| 2,295,206 | Fraumann et al. | Sept. 8, 1942 |
| 2,540,961 | Osplack | Feb. 6, 1951 |
| 2,659,158 | Cobb | Nov. 17, 1953 |
| 2,846,773 | Carlson | Aug. 12, 1958 |
| 2,906,030 | Hofler | Sept. 29, 1959 |
| 2,998,658 | Pergande | Sept. 5, 1961 |

FOREIGN PATENTS

| 904,282 | France | Feb. 19, 1945 |
| 819,319 | Germany | Oct. 31, 1951 |